(12) United States Patent
Kogan

(10) Patent No.: US 10,052,758 B2
(45) Date of Patent: Aug. 21, 2018

(54) METHOD FOR CONTROLLING A MANIPULATOR SYSTEM

(71) Applicant: KUKA Roboter GmbH, Augsburg (DE)

(72) Inventor: Yevgen Kogan, Augsburg (DE)

(73) Assignee: KUKA Roboter GmbH, Augsburg (DE)

(*) Notice: Subject to any disclaimer, the term of this patent is extended or adjusted under 35 U.S.C. 154(b) by 0 days.

(21) Appl. No.: 15/175,330

(22) Filed: Jun. 7, 2016

(65) Prior Publication Data

US 2017/0001305 A1   Jan. 5, 2017

(30) Foreign Application Priority Data

Jun. 30, 2015   (DE) .................. 10 2015 212 171

(51) Int. Cl.
*B25J 5/00*   (2006.01)
*B25J 9/12*   (2006.01)
(Continued)

(52) U.S. Cl.
CPC ............... *B25J 9/12* (2013.01); *B25J 5/007* (2013.01); *B25J 9/161* (2013.01); *B25J 9/162* (2013.01); *B25J 11/008* (2013.01); *G05B 2219/34027* (2013.01); *G05B 2219/40298* (2013.01); *G05B 2219/41293* (2013.01); *G05B 2219/45108* (2013.01)

(58) Field of Classification Search
CPC combination set(s) only.
See application file for complete search history.

(56) References Cited

U.S. PATENT DOCUMENTS 4,483,074 A * 11/1984 Rudzyanskas ....... B23O 1/5481
                                                              33/1 CC
4,763,055 A *  8/1988 Daggett ............. G05B 19/4141
                                                              318/565
(Continued)

FOREIGN PATENT DOCUMENTS

DE        10304019       11/2004
DE       102004048942     6/2005
(Continued)

OTHER PUBLICATIONS

Examination Report from GPTO in DE Appl. No. 10 2015 212 171.2, dated Oct. 27, 2015.
(Continued)

*Primary Examiner* — Jonathan L Sample

(57) ABSTRACT

A method for controlling a manipulator system including a manipulator, several drives and a mobile platform A first converter for actuating at least two of the several drives is associated with the manipulator system. The method includes the steps of: a) identifying one of the drives of the manipulator system that is associated with the first converter and that must be used to travel over a current planned movement path of the manipulator system, and (b) actuating the one identified associated drive by means of the first converter, where the actuated drive is used for the manipulator system to travel over the planned movement path. One of the at least two drives that is not being actuated is stationary preferably fixed or secured by a mechanical brake.

13 Claims, 3 Drawing Sheets

(51) Int. Cl.
*B25J 9/16* (2006.01)
*B25J 11/00* (2006.01)

(56) References Cited

U.S. PATENT DOCUMENTS

| | | | | |
|---|---|---|---|---|
| 4,786,847 A * | 11/1988 | Daggett | ............... | B25J 9/1633 318/568.2 |
| 4,868,472 A * | 9/1989 | Daggett | ............... | G05B 19/4141 318/567 |
| 5,523,663 A * | 6/1996 | Tsuge | ............... | B25J 9/162 318/568.16 |
| 5,737,500 A * | 4/1998 | Seraji | ............... | B25J 9/1643 318/568.11 |
| 5,758,298 A * | 5/1998 | Guldner | ............... | G01S 15/931 318/580 |
| 9,397,518 B1 * | 7/2016 | Theobald | ............... | H02J 7/025 |
| 9,655,679 B2 * | 5/2017 | Desai | ............... | A61B 90/11 |
| 9,791,860 B2 * | 10/2017 | Phillips | ............... | G05D 1/0033 |
| 2004/0257022 A1 * | 12/2004 | Trifilo | ............... | H02P 5/68 318/625 |
| 2005/0104547 A1 * | 5/2005 | Wang | ............... | B25J 3/04 318/568.2 |
| 2006/0012322 A1 * | 1/2006 | Matsumoto | ............... | H02P 5/74 318/432 |
| 2008/0027590 A1 * | 1/2008 | Phillips | ............... | G05D 1/0088 701/2 |
| 2008/0086241 A1 * | 4/2008 | Phillips | ............... | G05D 1/0038 701/2 |
| 2008/0150467 A1 * | 6/2008 | Hashimoto | ............... | B25J 9/1676 318/568.17 |
| 2009/0082879 A1 * | 3/2009 | Dooley | ............... | B25J 9/1658 700/3 |
| 2010/0145511 A1 * | 6/2010 | Popa | ............... | B25J 7/00 700/245 |
| 2010/0152899 A1 * | 6/2010 | Chang | ............... | B25J 9/162 700/262 |
| 2010/0234993 A1 * | 9/2010 | Seelinger | ............... | B25J 9/1697 700/254 |
| 2010/0243344 A1 * | 9/2010 | Wyrobek | ............... | B25J 5/007 180/21 |
| 2011/0106339 A1 * | 5/2011 | Phillips | ............... | G05D 1/0033 701/2 |
| 2013/0296885 A1 * | 11/2013 | Desai | ............... | A61B 19/201 606/130 |
| 2013/0325182 A1 * | 12/2013 | Setrakian | ............... | B25J 9/161 700/264 |
| 2014/0188273 A1 * | 7/2014 | Khoukhi | ............... | B25J 9/162 700/250 |
| 2015/0012163 A1 * | 1/2015 | Crawley | ............... | G05D 1/0248 701/23 |
| 2015/0032252 A1 * | 1/2015 | Galluzzo | ............... | B25J 5/007 700/218 |
| 2016/0318187 A1 * | 11/2016 | Tan | ............... | B25J 9/1697 |

FOREIGN PATENT DOCUMENTS

| | | |
|---|---|---|
| DE | 102009056578 | 6/2011 |
| DE | 102010015406 | 10/2011 |
| KR | 20050039934 A | 5/2005 |
| KR | 20150034440 A | 4/2015 |
| WO | 2014/045407 | 3/2014 |

OTHER PUBLICATIONS

The extended European Search Report, dated Oct. 18, 2016, in the related European Patent Appl. No. 16176131.7.
The English translation of the Korean Office Action, dated Sep. 9, 2017, in the related Korean Application No. 10-2016-0081780.
The English translation of the Chinese Office Action, dated Apr. 3, 2018, in the related Chinese Patent Application No. 201610511491.5.

* cited by examiner

METHOD FOR CONTROLLING A MANIPULATOR SYSTEM

This application claims the benefit of priority under 35 § 119(a) to German Patent Application No. 10 2015 212 171.2, filed on Jun. 30, 2015.

FIELD OF THE INVENTION

The invention relates to a method for controlling a manipulator system, which method enables the number of drive components required to be reduced. The invention further relates to a manipulator system with a reduced number of drive components.

BACKGROUND OF THE INVENTION

Manipulator systems typically comprise at least one manipulator that is controlled, for example, by means of a manipulator control device. A manipulator is a device that enables physical interaction with the environment. For this purpose, the manipulator is equipped with at least one drive, such as electric motors in particular. A movement axis of the manipulator can be moved by means of the drive. Typically, the manipulator comprises several drives and several movement axes. For example, a manipulator can be an industrial robot, an industrial robot being an automatically guided freely programmable multipurpose manipulator that can be programmed in three or more axes and can be arranged either in a stationary location or in a movable manner for use in automation technology.

A movable manipulator arrangement can be realized using a mobile platform, for example, that is guided on a linear axis, or the like. Moreover, mobile platforms can be used for the purpose of freely moving manipulators set up on them freely on a plane by equipping the platforms with appropriate flexible drive means. For this purpose, the drives of the mobile platform are expediently equipped with wheels, chains, tracks, or similar known devices.

Typically, the drives used in manipulator systems are electrical machines, such as electric motors. To actuate such a drive, a movement command is converted by a converter into a control signal. Converters are current rectifiers that generate variable-frequency and variable-amplitude alternating voltage (or alternating current) from alternating voltage (or alternating current). This alternating voltage (or alternating current) can be used to directly supply an electrical machine, such as an electric motor, for example, with power. Using a converter, an electrical machine can be operated in a speed- or torque-controlled manner. In known manipulator systems, a separate converter is associated with each drive. As a result, each drive is actuated by a converter, whereby a movement axis of a mobile platform or of a manipulator is moved in a targeted manner by means of the actuated drive, for example.

Some manipulator systems have several drive groups, which are usually actuated only alternately and thus not simultaneously. For example, in movably arranged manipulators, the movement axes of the mobile platform is often moved only when the movement axes of the manipulator are stationary, that is, when the manipulator is moved by means of the mobile platform to a new workspace, for example. Likewise, the movement axes of the manipulator are typically moved only when the movement axes of the mobile platform are stationary, that is, when the manipulator is positioned and aligned in its new workspace, for example.

The use of a converter for each drive of the manipulator system to be actuated generates costs, and the converters require installation space and, optionally, appropriate cooling systems, which also generate additional costs and require additional installation space. It is therefore the object of the present invention to eliminate the abovementioned drawbacks.

DETAILED DESCRIPTION OF THE INVENTION

The object according to the invention is achieved by a method for controlling a manipulator system, for example, as set forth in claim 1 and a manipulator system, for example, as set forth in claim 9.

In particular, for example, the object is achieved by a method for controlling a manipulator system, the manipulator system comprising several drives and the manipulator system further comprising a first converter for actuating at least two drives. The method has the following method steps:

a) Identification of the drives that must be used to travel over a planned movement path of the manipulator system;

b) Checking whether an identified drive that must be used to travel over the planned movement path of the manipulator system is being supplied with current by the first converter, and switching of the first converter to the drive to be used when it is not being supplied with current; and c) Actuation of the drive or drives connected to the first converter by means of the first converter in order to travel over the planned movement path of the manipulator system.

A manipulator system typically comprises at least one manipulator, the manipulator preferably having a manipulator arm with several members, but with at least one driven member. Moreover, the manipulator system can comprise a mobile platform on which or at which the manipulator is preferably set up. For example, a manipulator system comprises a mobile platform and a manipulator. Exemplary manipulator systems that comprise a manipulator and a mobile platform are lifting systems, assistance manipulator systems that provide support for people with limited mobility, for example, and/or movably arranged industrial robots such as the OMNIROB systems of KUKA AG, for instance. For example, typical lifting systems have a manipulator that is embodied substantially as a lifting cylinder. During the lifting of an object by means of such a lifting system, the lifting system is first positioned in part by means of a mobile platform under the object to be lifted. The mobile platform is then stopped, for example by means of suitable brakes on the axes, and the object to be lifted is then lifted by extending the lifting cylinder. Upon conclusion of the lifting movement, the manipulator (the lifting cylinder) is stopped, for example, and the mobile platform is moved in order to move the lifted object.

The movement path of a manipulator system determines a defined movement of a reference point in the Cartesian space. A complete movement path of the manipulator system can be composed of several movement paths. Through a corresponding movement of the movement axes of the manipulator and/or of the mobile platform, the desired or programmed movement path of the manipulator system can be traveled over. The movement axes of the manipulator and/or of the mobile platform are moved as a result of the converter, with which the drive of the corresponding movement axis is associated, actuates this drive. In this case, the actuating comprises the provision of a frequency- and/or amplitude-variable alternating voltage or of a variable alternating current.

In a first case, the at least two drives can be actuated alternately, i.e., not simultaneously, by means of the first converter for actuating at least two drives. The drive that is not being actuated is stationary or does not move and is preferably fixed or secured by a mechanical brake. In a second case, the at least two drives can be moved simultaneously, i.e., at the same time. In this second case, the drives are moved dependently on one another, since the converter only generates one control signal (i.e., one frequency- and amplitude-variable alternating voltage/current). It should be noted that, in the second case, the two simultaneously actuated drives are not operated at the maximum output of the converter, since the output of the converter is distributed to the simultaneously actuated drives. For example, if "n" drives are actuated simultaneously, then each drive can be operated at a maximum of 1/n of the output of the converter. For the majority of manipulator applications, it is therefore advantageous for the converter to be connected to exactly one drive, since only then is it able to bring about movements of the manipulator with its full output.

According to the first and/or the second case, at least one converter, i.e., one drive component, can be saved by actuating the drives by means of the first converter. This reduces the costs and the required installation space of the manipulator system.

The invention takes advantage of the fact that the planned movement path is known in principle before the traveling-over of the movement path by means of the manipulator system, namely from the manipulator control, for example. The drives of the manipulator system and of the converter that must be used to travel over a planned movement path of the manipulator system can thus already be identified immediately after the planning or programming of the movement path. At the latest, the identification of the drives must be concluded when the traveling-over of the movement path has begun. A movement path can also consist of several (partial) movement paths, it only being necessary for the identification of the required drives to be concluded when the traveling-over of the (first) partial movement path is begun.

To actuate a drive by means of a converter, current is supplied to the drive from the converter. The checking whether the drive that must be used during the planned path movement of the manipulator system is being supplied with current by the first converter enables quick and efficient actuation of the drives, since the only time a connection must be switched or established is when the drive to be used is not already being supplied with current anyway.

Preferably, the manipulator system further comprises at least one manipulator, the manipulator being a mobile manipulator and being arranged on a mobile platform of the manipulator system, the mobile platform being movable in at least one direction and preferably on one plane and comprising at least one drive that can be actuated by the first converter for actuating at least two drives.

If the mobile platform comprises at least one drive that can be actuated by the first converter, then the converter can actuate a drive of the mobile platform when a movement axis of the mobile platform is to be moved. For example, the mobile platform can thus be moved together with the manipulator by actuating the drive by means of the first converter. If the second drive that can be actuated by the first converter is a drive that is associated with a movement axis of the manipulator, then the movement axis of the manipulator is stopped in the meantime and can only be moved once the movement axis of the mobile platform associated with the converter is stationary. In this way, at least one converter can be saved, thus reducing the costs and the required installation space of the manipulator system.

Preferably, a movement axis of the manipulator system is associated with each of the at least two drives, and step a) of the method comprises identifying the axis angle of the movement axes (A1-A7, B1-B4; C1, C2, D1, D2) that are associated with the drives (51, 52, 61, 62) of the first converter, on at least a first and a second path point of the planned movement path of the manipulator system; and determining whether the axis angles of the movement axes (A1-A7, B1-B4; C1, C2, D1, D2) at the first path point differ from the second path point.

If the identifying of the drives that must be used for the traveling-over of a planned movement path of the manipulator system (i.e., step a)) is performed by means of the axis angle of the movement axes of the manipulator system, then the drives to be used can be identified from the planned movement path. Preferably, several path points are defined in space during the planning of the movement path. These path points are to be preferably traveled over successively by the manipulator system, thus resulting in the planned movement path. Preferably, each of these path points defines the position of the movement axes of the manipulator system. The position of a movement axis typically corresponds to the axis angle. If the axis angle of a movement axis does not differ from a first path point to a second path point, then the movement axis need not be moved on the movement path from this first path point to the second path point, and, accordingly, the drive need not be actuated or supplied with current.

When actuating the associated drive, the at least two drives can be actuated alternately, i.e., not simultaneously. In this first case, the drives can be moved independently of one another. The drive that is not being actuated does not move. For example, the mobile platform can first be moved, and a movement axis of the manipulator can then be moved.

After the change in the axis angle has been determined, in step c) the drives connected to the first converter are preferably actuated simultaneously by the first converter if the axis angles change equally in quantity and direction.

If the axis angle of a first movement axis changes from a first path point to a second path point equally in quantity and direction to the axis angle of a second movement axis, it is often possible to move the two drives simultaneously with the same converter. In this second case, the drives are moved dependently on one another, since the converter only generates one control signal (a frequency- and amplitude-variable alternating voltage/current). The at least two drives (e.g., "n" drives, with "n" being a natural number) are consequently operated at a maximum of 1/n of the output of the converter in this case. If the mobile platform of a manipulator system is equipped with two differentially driven wheels, then the mobile platform can be moved straight ahead through simultaneous actuation of the drives of the wheels. As a result of the simultaneous actuation, the actuated wheels have the same speed and torque, since the converter generates only one control signal, which is fed to both drives.

Preferably, the at least one converter associated with the manipulator system can actuate at least three, preferably at least four and most preferably at least six drives. If the converter can actuate several drives, then the number of required converters can be further reduced. In this way, the costs and installation space of the manipulator system can be further reduced.

Preferably, a movement axis of the manipulator system is associated with each of the drives associated with the first converter, the respective movement axis being blocked mechanically when the drive associated with the respective movement axis is not being actuated by the first converter.

When the drive that is not being actuated by the converter is mechanically blocked, then an unplanned movement, such as the sagging of the movement axis associated with the drive, for example, can be prevented. The sagging of a movement axis can occur as a result of weight or other external forces acting on the manipulator system, for example. Mechanical blocking offers the advantage that, after blocking, no energy need be fed to the drive any longer in order to prevent sagging. The manipulator system can thus be operated in an energy-efficient manner.

Preferably, at least one second converter for actuating at least two drives is still associated with the manipulator system. Through the provision of at least two converters for actuating at least two drives each, additional converters can be saved. Preferably, the second converter can be used like the first converter.

In particular, the object is also achieved by a manipulator system which comprises: a manipulator control device that is set up for the purpose of carrying out the method described above; at least one manipulator, the manipulator comprising several drives, the drives being electric motors; and a first converter, the converter being set up to actuate at least two drives of the manipulator system.

Preferably, the manipulator system further comprises a mobile platform with which at least one drive is associated, and the first converter is set up for actuating a drive of the manipulator and a drive of the mobile platform.

If the first converter is set up to actuate a drive of the manipulator and a drive of the mobile platform, then a drive of the mobile platform can be actuated using only one converter, and the mobile platform can thus be moved. If the drive of the mobile platform is not being actuated, a drive of a movement axis of the manipulator can be actuated and thus moved.

Preferably, the manipulator system further comprises a mobile platform with which at least two drives are associated, the manipulator comprising at least two drives and the first converter being set up for actuating at least one drive of the manipulator and at least one drive of the mobile platform. The manipulator system preferably further comprises a second converter that is set up to actuate at least one other drive of the manipulator and at least one other drive of the mobile platform.

If the mobile platform comprises at least two drives, and if each drive is associated with a movement axis, for example with a wheel of the mobile platform, then the mobile platform can be moved freely on a plane through appropriate actuation of the wheels.

DETAILED DESCRIPTION OF THE FIGURES

The figures are explained in further detail below.

Figure 1:
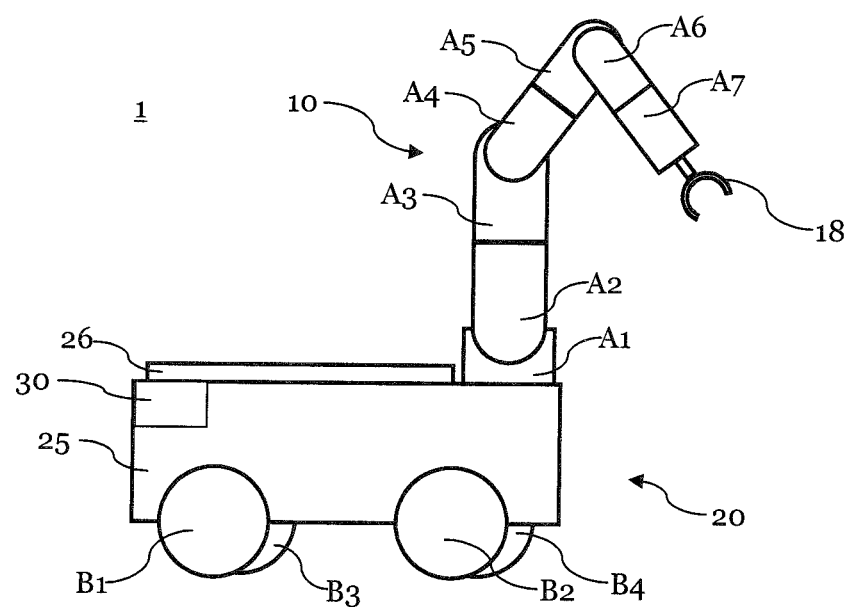
FIG. 1 shows a schematic representation of a first manipulator system.

FIG. 1 shows a schematic view of a manipulator system 1, which comprises a manipulator 10 and a mobile platform 20 as well as a manipulator control device 30. The manipulator 10 is a manipulator arm that is arranged on the mobile platform 20. The manipulator 10 comprises seven movement axes A1 to A7. A drive (not shown) is associated with each movement axis A1 to A7. The mobile platform 20 comprises a main body 25 and an upper side 26. Moreover, the mobile platform comprises four movement axes B1 to B4, which are preferably embodied as wheels and preferably as Mecanum wheels. Here as well, a drive is associated with each of the four movement axes B1 to B4. The manipulator system 1 thus comprises eleven drives. Objects can be placed onto the upper side 26 which can be gripped by the gripper 18 of the manipulator 10. Preferably, the manipulator system 1 comprises at least four converters, each of which can actuate at least two drives, as well as three conventional converters, each of which can actuate only one drive. The eleven drives can thus be controlled using only seven converters, and four converters can be saved.

Figure 2:
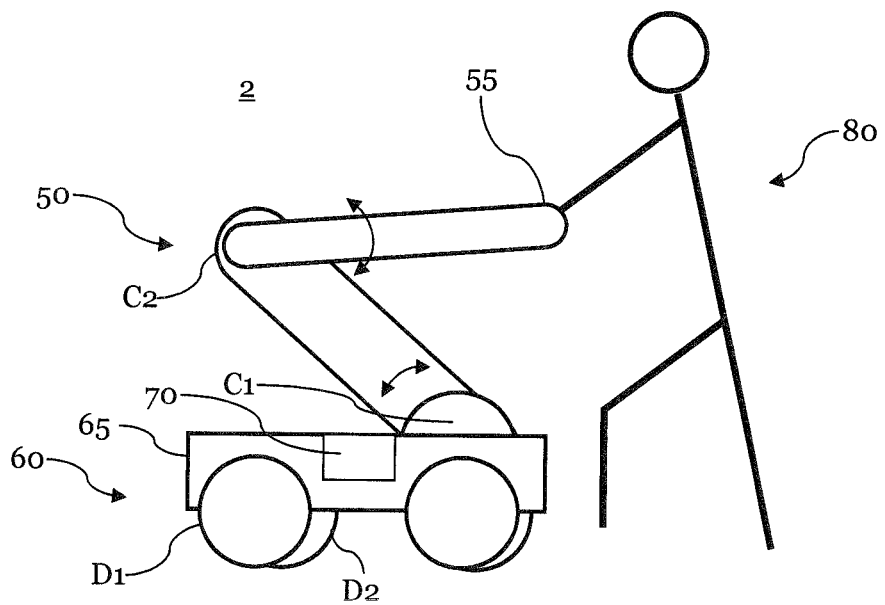
FIG. 2 shows a schematic representation of a second manipulator system.

FIG. 2 shows a schematic representation of a second manipulator system 2, which is an assistance manipulator system and is set up, for example, for the purpose of supporting people 80 with limited mobility. The manipulator system 2 comprises a manipulator 50 and a mobile platform 60 as well as a manipulator control device 70. The manipulator 50 comprises two movement axes C1 and C2 to each of which a drive (not shown) is associated. Moreover, the manipulator 50 comprises a grip 55 that is set up for the purpose of supporting a person with limited mobility. The height of the grip 55 can be adjusted by means of the movement axes C1 and C2, for example. The mobile platform 60 comprises a main body 65 as well as the movement axes D1 and D2, to each of which a drive is associated. Wheels are associated with the movement axes D1 and D2. For example, if the drives of the movement axes D1 and D2 are actuated simultaneously, then the mobile platform 60 moves straight ahead.

Alternatively, the grip 55 can be a divided grip that provides a separate grip for the left and right hand of a person 80 with limited mobility. For example, the grips for the left hand the right hand can be actuated by a respective drive (not shown) of the manipulator 50 in order to enable the height of the grip for the left and the right hand to be adjusted individually.

Preferably, the manipulator system 2 comprises at least two converters, each of which can actuate at least two drives. For example, each of the converters can be set up to actuate a drive of the manipulator and a drive of the mobile platform. This results in different actuation variants for the drives of the manipulator system 2, which are shown schematically in FIGS. 3 and 4.

Figure 3:
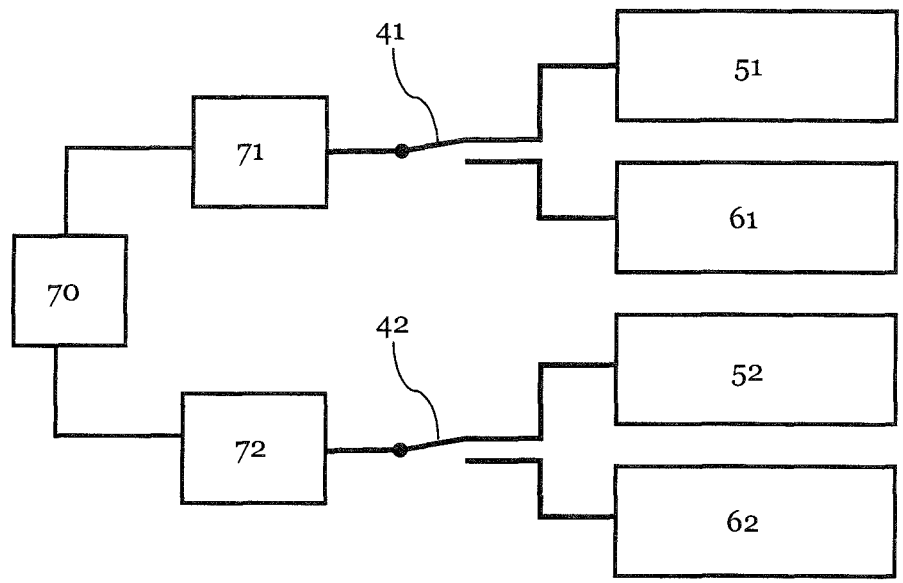
FIG. 3 shows a schematic operating diagram for actuating drives.
Figure 4:
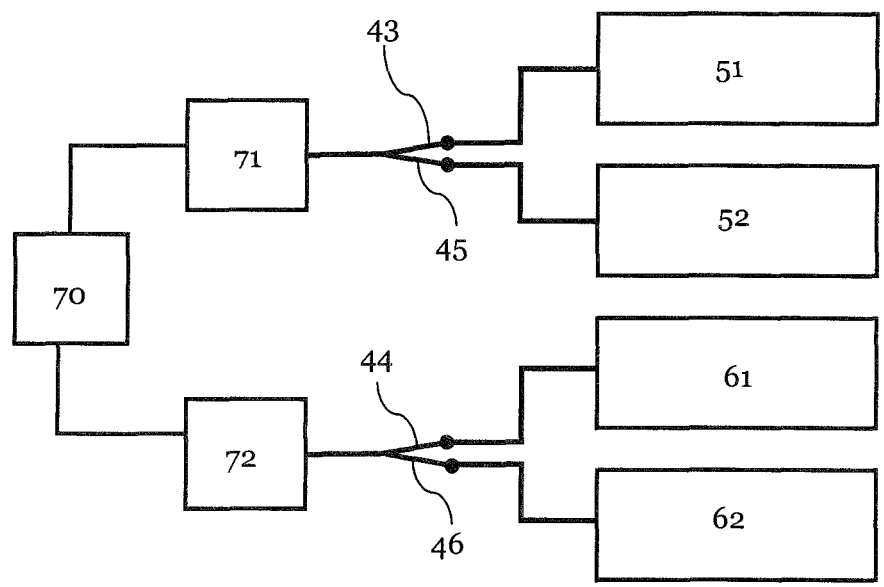
FIG. 4 shows a schematic operating diagram for actuating drives.

In FIGS. 3 and 4, reference symbol 70 designates the manipulator control device 70 of the manipulator system 2. Reference symbols 71 and 72 designate converters that are associated with the manipulator system 2. Reference symbols 51 and 52 designate drives of the manipulator 50, and reference symbols 61 and 62 designate drives of the mobile platform 60 of the manipulator system 2. It is clear to a person skilled in the art that the following exemplary description also applies analogously to the manipulator system 1, which differs substantially only through the greater number of movement axes.

FIG. 3 shows a schematic operating diagram for actuating drives 51, 52, 61, 62, which can be used for the manipulator system 2, for example. FIG. 3 shows a state in which the converters 71, 72 are connected by means of the switches 41, 42 to the drives 51, 52 of the manipulator 50. Consequently, the drives 51, 52 can be supplied with current and actuated independently of one another in this state. In the case of the manipulator system 2, the height of the grip 55 can thus be adjusted, for example. If the position of the switches 41, 42 is changed, then the drives 61, 62 of the mobile platform 60 can be actuated. The movement axes C1 and C2 are now stationary and blocked, for example, by means of a mechanical brake, whereby the grip 55 remains at the set height. The mobile platform 60 can now be moved freely according to the commands of the manipulator control device.

FIG. 4 shows a schematic operating diagram for actuating drives 51, 52, 61, 62, which can also be used for the manipulator system 2, for example. In the depicted operating diagram, the converters 71, 72 can each simultaneously actuate two drives 51, 52, 61, 62. For this purpose, the switches 43, 44, 45, 46 are closed and each converter is connected to two drives. In the depicted example, the converter 71 is connected to the drives 51 and 52 of the manipulator 50, and the converter 71 is connected to the drives 61 and 62 of the mobile platform 60. Through appropriate actuation of the drives, the mobile platform 60 can be moved simultaneously in a first direction and the grip 55 adjusted upward, for example. In this way, a kind of assistance for standing up can be provided to a person 80 with limited mobility. The connection of the converter 72 to both drives 61 and 62 of the mobile platform has the effect that both movement axes D1 and D2 are operated simultaneously, i.e., the mobile platform can only move straight ahead in this manner, which is helpful for the application as an aid for standing up, however. However, the configuration of FIG. 3 is better suited to enabling curved paths of motion in the depicted example. As will readily be understood, it is also possible to combine the configuration variants of FIGS. 3 and 4 by means of suitable switches, whereby it is possible, for example, for the converter 71 to be connected either to only one drive 51 or 52 or to both drives 51 and 52 at the same time, i.e., simultaneously.

Figure 5:
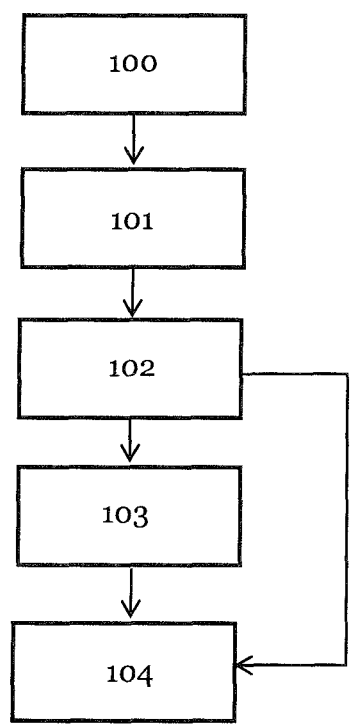
FIG. 5 shows a schematic flowchart of the method.

FIG. 5 shows a schematic flowchart of a method for controlling a manipulator system 1 or 2. In step 100, a movement path of the manipulator system is first planned. The movement path can be composed of several individual movement paths. Preferably, a movement path comprises at least two path points. In step 101, the drives of the manipulator system associated with the converter, such as the converter 71 or 72, for example, required to travel over the planned movement path of the manipulator system are identified. For this purpose, in step 101, for example, the changes in the axis angles of the movement axes A1 to A7, B1 to B4; C1, C2, D1, D2 that are associated with the drives of the first converter from a first path point to a second path point of the planned movement path of the manipulator system are determined. In step 102, it is then checked whether an identified drive that must be used during the planned movement path of the manipulator system is currently being supplied with current by the converter. If this is not the case, in step 103 the converter is switched to the drive to be used. In step 104, the drive or drives connected to the converter by means of the converter in order to travel over the planned movement path of the manipulator system are then actuated.

It should be noted that the invention claimed herein is not limited to the described embodiments, but may be otherwise variously embodied within the scope of the claims listed infra.

LIST OF REFERENCE SYMBOLS 1, 2 manipulator system
10 manipulator
18 end effector
20 mobile platform
25 main body
26 upper side
30, 70 manipulator control device
71, 72 converter
41, 42, 43, 44, 45, switch
46
50 manipulator
51, 52 drives of the manipulator 50
55 grip
60 mobile platform
61, 62 drives of the mobile platform 60
65 main body
80 user
A1 to A7 movement axes of the manipulator 10
B1 to B4 movement axes of the mobile platform 20
C1, C2 movement axes of the manipulator 50
D1, D2 movement axes of the mobile platform 60

The invention claimed is:

1. A method for controlling a manipulator system including a manipulator control device and a at least one manipulator comprising several drives and a first converter for converting movement commands from the manipulator control device into control signals for actuating at least two of the several drives, the method performed by the manipulator control device and comprising the steps of:
   a) identifying one or more of the several drives that must be used to travel over a planned movement path of the manipulator system, the planned movement path defining programmed movement of a reference point traveling between at least two path points in Cartesian space;
   b) checking whether the one or more identified drives that must be used to travel over the planned movement path of the manipulator system are connected to and being supplied with control signals by the first converter, and switching the first converter to connect to one of the one or more identified drives that is not connected to and supplying control signals to the identified drive; and
   c) actuating the one or more connected, identified drives of the first converter in order to travel over the planned movement path of the manipulator system.

2. The method as set forth in claim 1, wherein in method step b) the converter is connected to exactly one drive.

3. The method as set forth in claim 1, wherein the manipulator system comprises at least one manipulator, wherein the at least one manipulator is a mobile manipulator arranged on a mobile platform of the manipulator system, and wherein the mobile platform is movable in at least one direction on one plane and comprises at least one of the several drives that can be actuated by the first converter.

4. The method as set forth in claim 1, wherein one of a plurality of movement axes of the manipulator system is associated with each of the several drives, and wherein step a) further comprises:

determining axis angles of ones of the movement axes that are associated with each of the several drives of the first converter, on at least one first and one second path point of the planned movement path of the manipulator system; and determining whether the axis angles of the movement axes at the first path point differ from the second path point.

5. The method as set forth in claim 1, wherein step c) further comprises: simultaneously actuating the several drives connected to the first converter by means of the first converter when the determined axis angles at the at least one first and one second path points change equally in quantity and direction.

6. The method as set forth in claim 1, wherein the at least one converter associated with the manipulator system can actuate at least three drives.

7. The method as set forth in claim 1, wherein one of a plurality of movement axes of the manipulator system is associated with each of the several drives, and wherein a respective movement axis is mechanically blocked when the drive associated with the respective movement axis is not being actuated by the first converter.

8. The method as set forth in claim 1, wherein the manipulator system includes at least one second converter for actuating at least two additional ones of the several drives, the method comprising the additional steps of:

d) identifying one or more of the additional drives that must be used to travel over the planned movement path of the manipulator system;

e) checking whether the one or more identified additional drives that must be used to travel over the planned movement path of the manipulator system are connected to and being supplied with current by the second converter, and switching the second converter to connect to one of the one or more identified additional drives that is not connected to and supplying current to the identified additional drive; and f) actuating the one or more connected, identified drives of the second converter in order to travel over the planned movement path of the manipulator system.

9. A manipulator system comprising:
a manipulator control device;
at least one manipulator comprising several drives, the drives including electric motors; and
a first converter configured to convert movement commands from the manipulator control device into control signals to actuate at least two of the several drives of the manipulator system,
wherein the manipulator control device is configured to: a) identify one or more of the several drives that must be used to travel over a planned movement path of the manipulator system, the planned movement path defining a programmed movement of a reference point traveling between at least two path points in Cartesian space, b) check whether the one or more identified drives are connected to and being supplied with control signals by the first converter, c) switch the first converter to connect to one of the one or more identified drives that is not connected to and supplying control signals to the identified drive, and d) actuate the one or more connected, identified drives connected to the first converter in order to travel over the planned movement path of the manipulator system.

10. The manipulator system as set forth in claim 9, wherein the manipulator system further comprises a mobile platform with which at least an additional one drive of the several drives is associated; and wherein
the first converter is configured to actuate each of the connected, identified drive of the manipulator and the additional drive of the mobile platform.

11. The manipulator system as set forth in claim 9, wherein:
the manipulator system further comprises a mobile platform with which at least two additional drives are associated;
the at least one manipulator comprises at least two drives;
the first converter is configured to actuate at least one drive of the manipulator and at least one drive of the mobile platform; and
the manipulator system further comprises a second converter configured to actuate at least one other drive of the manipulator and at least one other drive of the mobile platform.

12. The method as set forth in claim 6, wherein the at least one converter associated with the manipulator system can actuate at least four drives.

13. The method as set forth in claim 12, wherein the at least one converter associated with the manipulator system can actuate at least six drives.

* * * * *